United States Patent [19]

Kojima et al.

[11] Patent Number: 4,691,673
[45] Date of Patent: Sep. 8, 1987

[54] CERAMIC AUXILIARY COMBUSTION CHAMBER

[75] Inventors: Takio Kojima; Masato Taniguchi, both of Aichi, Japan

[73] Assignee: NGK Spark Plug Co., Ltd., Aichi, Japan

[21] Appl. No.: 848,975

[22] Filed: Apr. 7, 1986

[30] Foreign Application Priority Data

Apr. 8, 1985 [JP] Japan .................. 60-51134

[51] Int. Cl.⁴ .................. F02B 3/00
[52] U.S. Cl. .................. 123/271
[58] Field of Search .......... 123/271, 272, 273

[56] References Cited

U.S. PATENT DOCUMENTS 4,426,966  1/1984  Huther .................. 123/271

FOREIGN PATENT DOCUMENTS 59-200012  11/1984  Japan .................. 123/271

Primary Examiner—Ronald B. Cox
Attorney, Agent, or Firm—Finnegan, Henderson, Farabow, Garrett and Dunner

[57] ABSTRACT

A ceramic auxiliary combustion chamber for an internal combustion engine where a ceramic nozzle body with an integrally fitted gasket is mounted into an opening in the cylinder head.

16 Claims, 8 Drawing Figures

4,691,673

CERAMIC AUXILIARY COMBUSTION CHAMBER

BACKGROUND OF THE INVENTION

The present invention relates to an improved ceramic auxiliary combustion chamber. More particularly, the present invention relates to an auxiliary combustion chamber having a nozzle body mounted onto a cylinder head of an internal combustion engine such as a diesel engine or the like.

Engines which use an auxiliary combustion chamber to complete combustion in a relatively short time have been widely used in order to respond to the demand for miniaturization and high speed. In such engines, it is necessary to use a heat-resistant metal alloy as material for the body forming the nozzle of the chamber because it is subject to a high temperature in operation. Such heat-resistant metals are expensive and this results in increased cost thus causing a limited use.

In a auxiliary combustion chamber for a diesel engine or the like, in order to improve the combustion efficiency thereof by thermally insulating the same or to prevent parts thereof exposed to a high temperature from melting, ceramic auxiliary combustion chambers which are superior in adiabatic and heat-resistant properties have been studied and partly put to practical use.

Ceramics, however, have shortcomings in that they may be apt to be broken by thermal stress and they are brittle. To reduce thermal stress by reducing temperature gradients and to reduce assembling stress, a proposed device, as shown in FIG. 7, has been provided. In such a device, a ceramic nozzle body 3, having a nozzle 2 formed at its lower portion, is attached to a cylinder head 1 through a gasket 5 disposed on the upper portion of the nozzle body 3. A space 4 is maintained between the cylinder head 1 and the ceramic nozzle body 3 (Japanese Patent Unexamined Publication No. 59-200012).

In this proposed device, the nozzle body 3 is inserted after the gasket 5 has been mounted to the cylinder head 1, and therefore the side surface of the nozzle body 3 might come directly in contact with the cylinder head 1. When this occurs, thermal stress can arise by local heat removal from the nozzle body. Further, the gasket 5 and the ceramic nozzle body 3 are separately formed, and therefore the attaching of the gasket might be erroneously omitted. In the drawing, the reference numeral 6 designates a fuel injection nozzle, and the reference numeral 7 designates a glow plug.

SUMMARY OF THE INVENTION

The above mentioned problems in the prior art have been solved by integrally fitting an annular gasket onto the ceramic nozzle body at its shoulder portion.

Further, the possibility of contact between the cylinder head and the nozzle body is completely obviated by providing a axially extending portion on the gasket.

Since the annular gasket is integrally fitted onto the shoulder portion of the nozzle body, the assembling process is improved and a predetermined space can be maintained between the cylinder head and the nozzle body while the nozzle body is being mounted.

In the present invention, the auxiliary combustion chamber for internal combustion engine has a cylinder head with an opening therein. This opening has an internal surface. The auxiliary combustion chamber includes a ceramic nozzle body disposed in the opening, having an external surface dimensioned to fit in the opening while allowing a space to be maintained between the external surface of the nozzle body and the internal surface of the opening. An annular gasket is integrally fit on the external surface of the nozzle body to seal the space between the internal surface of the opening and the external surface of the nozzle body.

DESCRIPTION OF THE PREFERRED EMBODIMENTS

Figure 1:
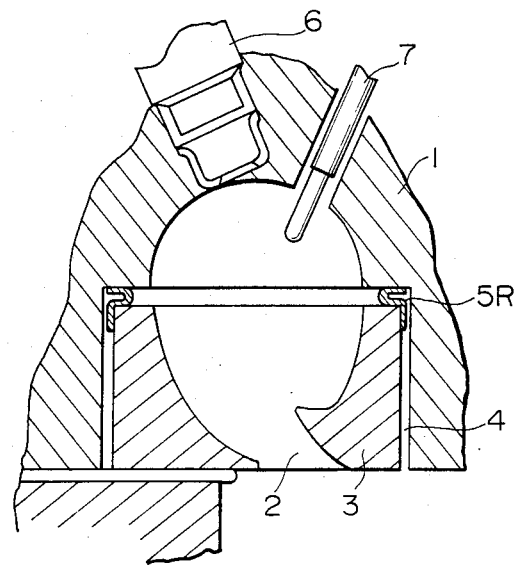
FIGS. 1 and 3 are longitudinal sectional views showing the mounting of the ceramic nozzle bodies mounted to the cylinder heads, according to the present invention.
Figure 2:
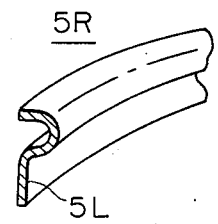
FIGS. 2 and 4 are partial perspective views showing the structures of the gaskets used in FIGS. 1 and 3, respectively.

In FIG. 1, the reference numeral 1 designates a cylinder head. A fuel injection nozzle 6 and a glow plug 7 are inserted into the upper portion of the auxiliary combustion chamber in the cylinder head 1. In the lower portion of the cylinder head, there is mounted a ceramic nozzle body 3 having a nozzle 2 in the lower portion thereof. An annular gasket 5-R is integrally fitted onto the shoulder portion and inserted into an area between the portion of the cylinder head 1 and the nozzle body 3 defining the auxiliary chamber. A space 4 is maintained between the nozzle body 3 and the cylinder head 1. As shown in FIG. 2, the annular member 5-R used herein has a U-shaped cross section opened outward at its upper portion with an axially extending flange portion 5-L so that the necessary space 4 can unconditionally be maintained between the ceramic nozzle body 3 and the cylinder head 1.

A construction as described above was examined in real operation under a whole load condition for 100 hours and no abnormality could be seen in the metal surrounding the ceramic auxiliary combustion chamber or in the gasket.

The gasket material may be SUS 631 or any other heat-resistant metal alloy.

Figure 3:
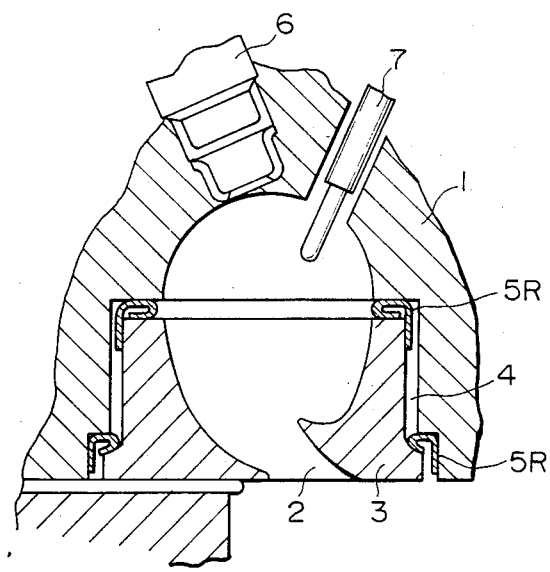
Figure 4:
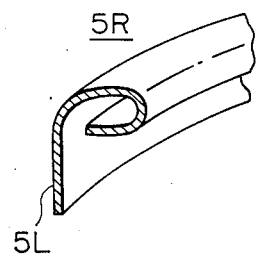

In FIG. 3, the ceramic nozzle body 3 is formed to have a larger diameter at its lower portion and a smaller diameter at its upper portion. The nozzle body 3 has two annular gaskets 5-R integrally mounted onto the upper and lower shoulder portions. In this embodiment, the gaskets work more effectively to prevent inclination of the nozzle body. In FIG. 3, the same items as those in FIG. 1 are correspondingly referenced and description about them will be omitted.

Each of the annular gaskets used herein has an inward bent P-shaped cross section including an axially extending flange portion 5-L so that the necessary space 4 can unconditionally be maintained between the ceramic nozzle body 3 and the cylinder head 1.

A construction as described above was examined in real operation under a whole load condition for 100 hours and no abnormality could be seen in the metal surrounding the ceramic auxiliary combustion chamber or in the gaskets.

Figure 5:
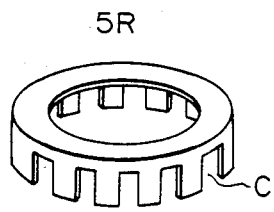
FIGS. 5 and 6A & 6B are perspective views showing examples of other structures of annular gaskets to be used in the present invention.

FIG. 5 shows a gasket 5-R provided with notches C at the lower end of the axially extending fitting portion of the gasket so as to obtain the above mentioned effects with low cost, as well as to improve workability in fitting the nozzle body.

Figure 6:
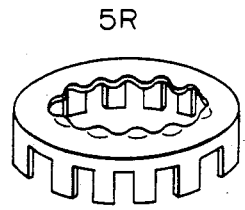
Figure 7:
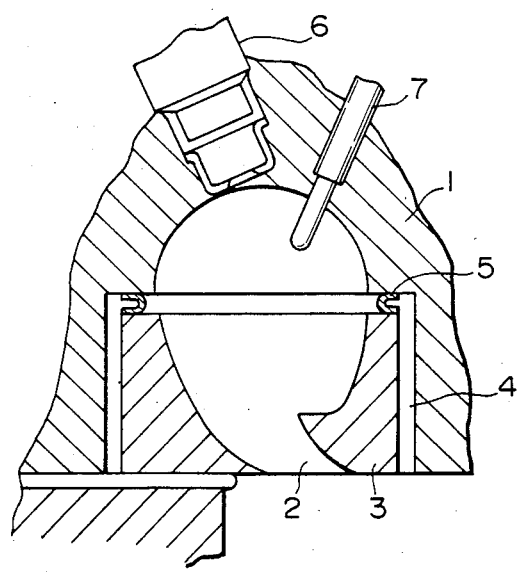
FIG. 7 is a longitudinal view showing a conventional ceramic nozzle body mounted to a cylinder head.

FIG. 6 shows a gasket 5-R made of a metal plate by cutting off along the outward and inward portions of a ring so the gasket can be more reduced in cost than that of FIG. 5 with the same effects as described above.

According to the present invention, as described above, the annular gasket (or gaskets) is (are) integrally fitted to the shoulder portion (or portions) of the ceramic nozzle body which is excellent in thermal resistance. Thus, it is possible to simplify the mounting of the nozzle body onto the cylinder head to perform mass production, to prevent the gasket from being erroneously omitted in assembly, and to easily and accurately maintain a necessary space between the nozzle body and the cylinder head.

What is claimed is:

1. An auxiliary combustion chamber for an internal combustion engine, the chamber being disposed to be mounted within an opening in a cylinder head, the opening having an internal surface, the chamber being defined by:
   a ceramic nozzle body disposed in said opening, said nozzle body having an axis and an external surface dimensioned to fit in said opening while maintaining a space between said external surface and said internal surface; and
   a one piece annular gasket integrally fit on said external surface to seal said space between said internal surface and said external surface, said gasket having a first portion extending parallel to said nozzle body axis and gripping said external surface of said nozzle body and a second portion extending perpendicular to said nozzle body axis.

2. An auxiliary combustion chamber as recited in claim 1, wherein said second portion extends from said first portion, said second portion having a U-shaped cross section opening outwardly toward said internal surface of said opening.

3. A device defining an auxiliary combustion chamber, the device being disposed within an opening in a cylinder head of an internal combustion engine, the cylinder head including a circular opening having an internal surface, the device comprising:
   a ceramic nozzle body disposed in said opening, said nozzle body having an axis and an external surface including a cylindrical peripheral surface portion and a radially extending surface portion at one end to form a shoulder; said nozzle body being dimensioned to provide a space between said external surface and said internal surface; and
   a one piece annular gasket having a first portion extending parallel to said nozzle body axis integrally fit on and gripping said cylindrical peripheral surface portion adjacent said shoulder and a second portion extending perpendicular to said nozzle body axis; said gasket sealing said provided space.

4. The device as recited in claim 3, wherein said second portion has a U-shaped cross section opening outwardly toward said internal surface of the opening; said second portion covering a portion of said radially extending surface portion.

5. A device defining an auxiliary combustion chamber for an internal combustion engine including a cylinder head with a circular opening therein, the opening having an internal surface, the device comprising:
   a ceramic nozzle body disposed in said opening, said nozzle body having an axis and a lower cylindrical external surface portion and an upper cylindrical external surface portion, said lower portion having a larger diameter than said upper portion to form a first shoulder intermediate said upper and lower portions; said nozzle body having a radially extending surface at one end to form a second shoulder; said nozzle body being dimensioned to provide a space between said upper and lower external surface portions of said nozzle body and the internal surface of said circular opening:
   a first annular gasket integrally fit on said lower cylindrical external surface portion at said first shoulder; and
   a second annular gasket, said second annular gasket being one piece integrally fit on said upper cylindrical external surface portion at said second shoulder, said second gasket having a first portion extending parallel to said nozzle body axis and gripping said upper cylindrical external surface portion of said nozzle body and a second portion extending perpendicular to said nozzle body axis; said first and second annular gaskets sealing said provided space.

6. A nozzle body for an auxiliary combustion chamber of an internal combustion engine, comprising:
   a ceramic member having an axis and a cylindrical peripheral surface and a radially extending surface at one end forming a shoulder; and
   a one piece annular gasket integrally fit on said cylindrical peripheral surface adjacent said shoulder, said gasket having a first portion extending parallel to said ceramic member axis and gripping said cylindrical peripheral surface and a second portion extending perpendicular to said nozzle body axis.

7. A nozzle body as recited in claim 6, wherein said second portion extends from said first portion, said second portion having a U-shaped cross section opening outwardly from said cylindrical peripheral surface.

8. An auxiliary combustion chamber for an internal combustion engine, said chamber being disposed to be mounted within an opening in said cylinder head, said opening having an internal surface, said chamber being defined by:
   a ceramic nozzle body disposed in said opening, said nozzle body having an axis and an external surface dimensioned to fit in said opening while maintaining a space between said external surface and said internal surface; and
   an annular gasket integrally fit on said external surface to seal said space between said internal surface and said external surface; said annular gasket having a P-shaped cross-section, bent inwardly of said external surface, including an axially extending portion covering a portion of said external surface.

9. A device defining an auxiliary combustion chamber, said device being disposed within an opening in the cylinder head of an internal combustion engine, said cylinder head including a circular opening having an internal surface, said device comprising:
   a ceramic nozzle body disposed in said opening, said nozzle body having an axis and an external surface including a cylindrical peripheral surface portion and a radially extending surface portion at one end to form a shoulder; said nozzle body being dimensioned to provide a space between said external surface and said internal surface; and an annular gasket integrally fit on said cylindrical peripheral surface portion adjacent said shoulder to seal said provided space; said annular gasket having a P-shaped cross section, bent inwardly of said cylindrical peripheral surface, including an axially extending portion covering a portion of said cylindrical peripheral surface portion.

10. A device defining an auxiliary combustion chamber, said device being disposed within an opening in the cylinder head of an internal combustion engine, said cylinder head including a circular opening having an internal surface, said device comprising:
  a ceramic nozzle body disposed in said opening, said nozzle body having an axis and an external surface including a cylindrical peripheral surface portion and a radially extending surface portion at one end to form a shoulder; said nozzle body being dimensioned to provide a space between said external surface and said internal surface; and
  an annular gasket integrally fit on said cylindrical peripheral surface portion adjacent said shoulder to seal said provided space; said annular gasket having a radially extending portion, and an axially extending portion covering a portion of said cylindrical peripheral surface portion; said axially extending portion having a plurality of spaced notches therein.

11. A device defining an auxiliary combustion chamber for an internal combustion engine including a cylinder head with a circular opening therein, said opening having an internal surface, said device comprising:
  a ceramic nozzle body disposed in said opening, said nozzle body having an axis, a lower cylindrical external surface portion and an upper cylindrical external surface portion, said lower portion having a larger diameter than said upper portion to form a first shoulder intermediate said upper and lower portions; said nozzle body having a radially extending surface at one end to form a second shoulder; said nozzle body being dimensioned to provide a space between said upper and lower external surface portions of said nozzle body and said internal surface of said circular opening;
  a first annular gasket integrally fit on said lower cylindrical external surface portion at said first shoulder; said first annular gasket having a P-shaped cross section bent inwardly of said lower external surface; said first gasket integrally fit on said first shoulder; and
  a second annular gasket integrally fit on said upper cylindrical external surface portion at said second shoulder; said second annular gasket having a P-shaped cross section, bent inwardly of said upper external surface, including an axially extending portion covering a portion of said upper external surface; said first and second annular gaskets sealing said provided space.

12. A nozzle body for an auxiliary combustion chamber of an internal combustion engine, comprising:
  a ceramic member having an axis, a cylindrical peripheral surface and a radially extending surface at one end forming a shoulder; and
  an annular gasket integrally fit on said cylindrical peripheral surface adjacent said shoulder; said gasket having a P-shaped cross-section, bent inwardly of said radially extending surface, including an axially extending portion covering a portion of said cylindrical peripheral surface.

13. A nozzle body for an auxiliary combustion chamber of an internal combustion engine, comprising:
  a ceramic member having an axis, a cylindrical peripheral surface and a radially extending surface at one end forming a shoulder; and
  an annular gasket integrally fit on said cylindrical peripheral surface adjacent said shoulder; said gasket having a radially extending portion, and an axially extending portion covering a portion of said cylindrical peripheral surface; said axially extending portion having a plurality of spaced notches therein.

14. An auxiliary combustion chamber for an internal combustion engine, said chamber being disposed to be mounted within an opening in said cylinder head, said opening having an internal surface, said chamber being defined by:
  a ceramic nozzle body disposed in said opening, said nozzle body having an axis and an external surface dimensioned to fit in said opening while maintaining a space between said external surface and said internal surface;
  an annular gasket integrally fit on said external surface to seal said space between said internal surface and said external surface; said annular gasket having an axially extending first portion covering a portion of said external surface of said nozzle body, and an integrally formed second portion extending from said first portion, said second portion having a U-shaped cross section opening outwardly toward said internal surface of said opening.

15. A device defining an auxiliary combustion chamber, said device being disposed within an opening in the cylinder head of an internal combustion engine, said cylinder head including a circular opening having an internal surface, said device comprising:
  a ceramic nozzle body disposed in said opening, said nozzle body having an axis and an external surface including a cylindrical peripheral surface portion and a radially extending surface portion at one end to form a shoulder; said nozzle body being dimensioned to provide a space between said external surface and said internal surface; and
  an annular gasket integrally fit on said cylindrical peripheral surface portion adjacent said shoulder to seal said provided space; said annular gasket having an axially extending first portion covering a portion of said peripheral surface portion and an integrally formed second U-shaped cross section portion extending from said first portion opening outwardly toward said internal surface of the opening; said second portion covering a portion of said radially extending surface portion.

16. A nozzle body for an auxiliary combustion chamber of an internal combustion engine, comprising:
  a ceramic member having an axis, a cylindrical peripheral surface and a radially extending surface at one end forming a shoulder; and
  an annular gasket integrally fit on said cylindrical peripheral surface adjacent said shoulder; said annular gasket having an axially extending first portion covering a portion of said cylindrical peripheral surface, and an integrally formed second portion extending from said first portion, said second portion having a U-shaped cross section portion opening outwardly from said cylindrical peripheral surface, said second portion covering a portion of said radially extending surface.

* * * * *